US008844067B2

(12) United States Patent
Quintana et al.

(10) Patent No.: US 8,844,067 B2
(45) Date of Patent: Sep. 30, 2014

(54) TOILET FILL VALVE WATER LEAK AND OVERFLOW NOTIFICATION DEVICE

(75) Inventors: Richard Quintana, Westminister, CA (US); David Millar, Aliso Viejo, CA (US); Kermit L. Achterman, La Canada Flintridge, CA (US)

(73) Assignee: Ceto Technologies Holdings, LLC, Flagstaff, AZ (US)

( * ) Notice: Subject to any disclaimer, the term of this patent is extended or adjusted under 35 U.S.C. 154(b) by 0 days.

(21) Appl. No.: 13/342,359

(22) Filed: Jan. 3, 2012

(65) Prior Publication Data

US 2012/0211094 A1 Aug. 23, 2012

Related U.S. Application Data

(60) Provisional application No. 61/445,824, filed on Feb. 23, 2011.

(51) Int. Cl.
*E03D 11/02* (2006.01)
*F16K 3/08* (2006.01)
*F16K 37/00* (2006.01)
*F16K 31/00* (2006.01)
*E03D 1/00* (2006.01)

(52) U.S. Cl.
CPC ............. *F16K 3/08* (2013.01); *F16K 37/005* (2013.01); *F16K 31/003* (2013.01); *E03D 1/00* (2013.01)

USPC .................................. 4/427; 4/240; 4/421

(58) Field of Classification Search
USPC ............. 4/427, 240, 421; 137/430, 426, 420, 137/421, 613
See application file for complete search history.

(56) References Cited

U.S. PATENT DOCUMENTS

| 6,016,577 | A  | * | 1/2000 | Cooley ............................ 4/427 |
| 6,178,569 | B1 | * | 1/2001 | Quintana ......................... 4/427 |
| 6,581,216 | B1 | * | 6/2003 | Halsell ............................. 4/415 |
| 6,934,977 | B1 | * | 8/2005 | Quintana et al. .................. 4/427 |
| 2006/0242756 | A1 | * | 11/2006 | Fields ............................. 4/427 |

* cited by examiner

*Primary Examiner* — Huyen Le
*Assistant Examiner* — Lauren Heitzer

(57) ABSTRACT

A device to shut-off a water supply to a toilet diverts water from a toilet fill valve to a shut-off valve that has a housing that includes a valve mechanism, a trip mechanism, and a trip circuit. The trip mechanism includes a rotational spring that urges closing of the valve mechanism. A trip latch is adapted to prevent closing of the valve mechanism except when withdrawn from the valve mechanism by a solenoid that is electrically connected to the trip circuit. The trip circuit includes at least one trip sensor input and a power source, such that when the trip circuit detects a fault condition on any of the trip sensors, the trip circuit connects power to the solenoid to withdraw the solenoid to close the valve mechanism. A rest knob may then be rotated to reset the valve mechanism into a valve-open position.

19 Claims, 9 Drawing Sheets

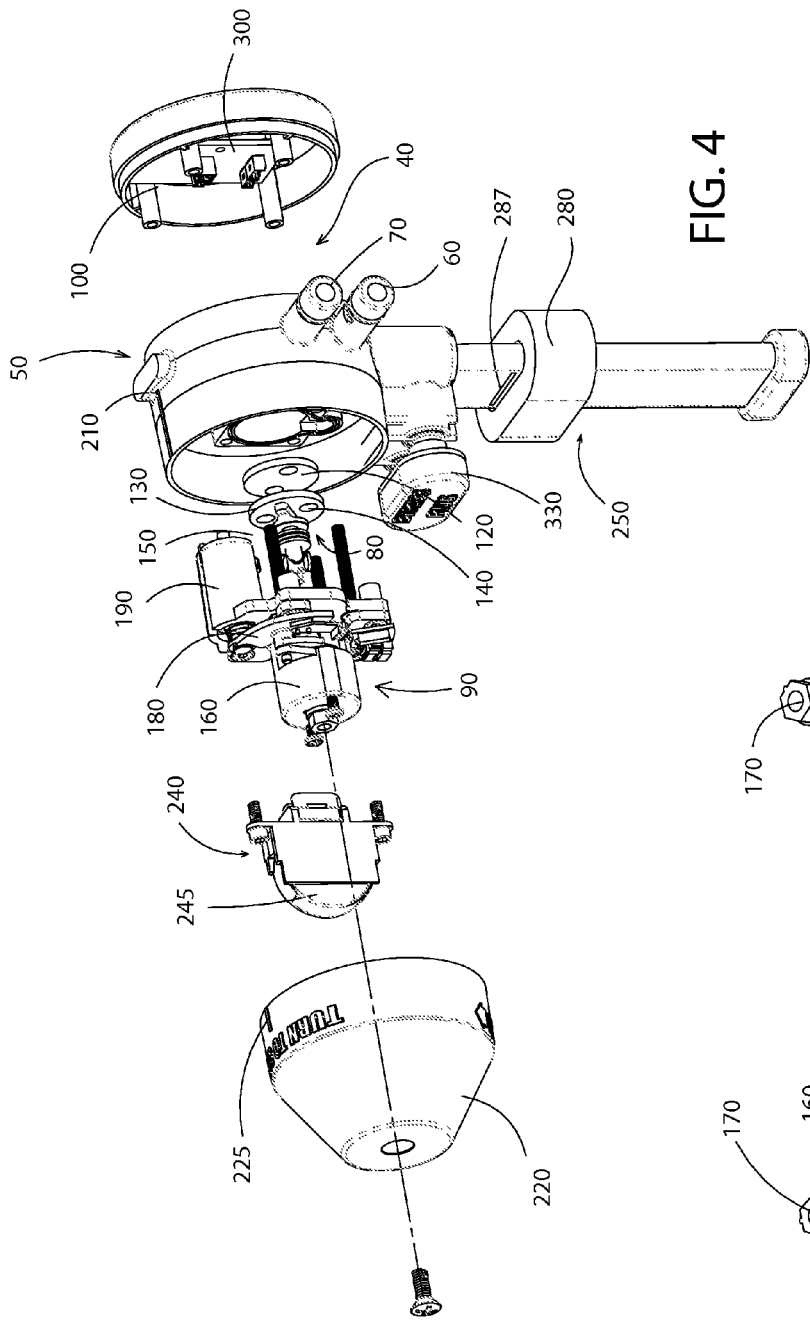
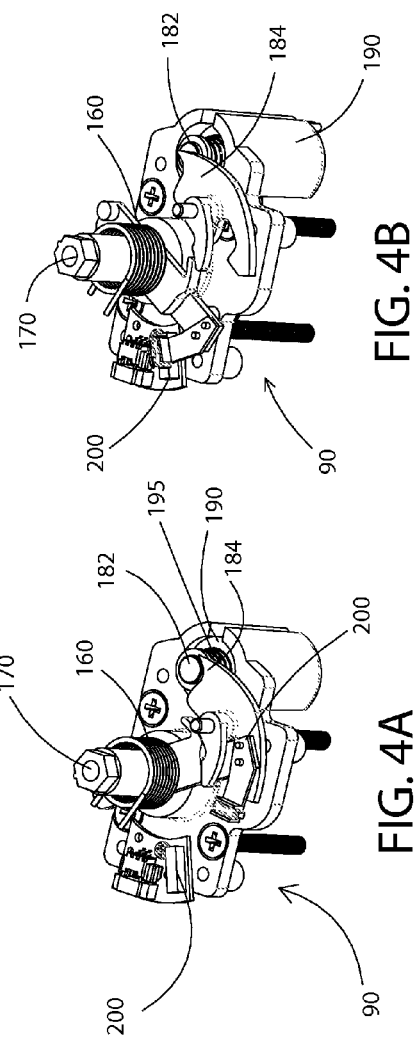
FIG. 4
FIG. 4A
FIG. 4B

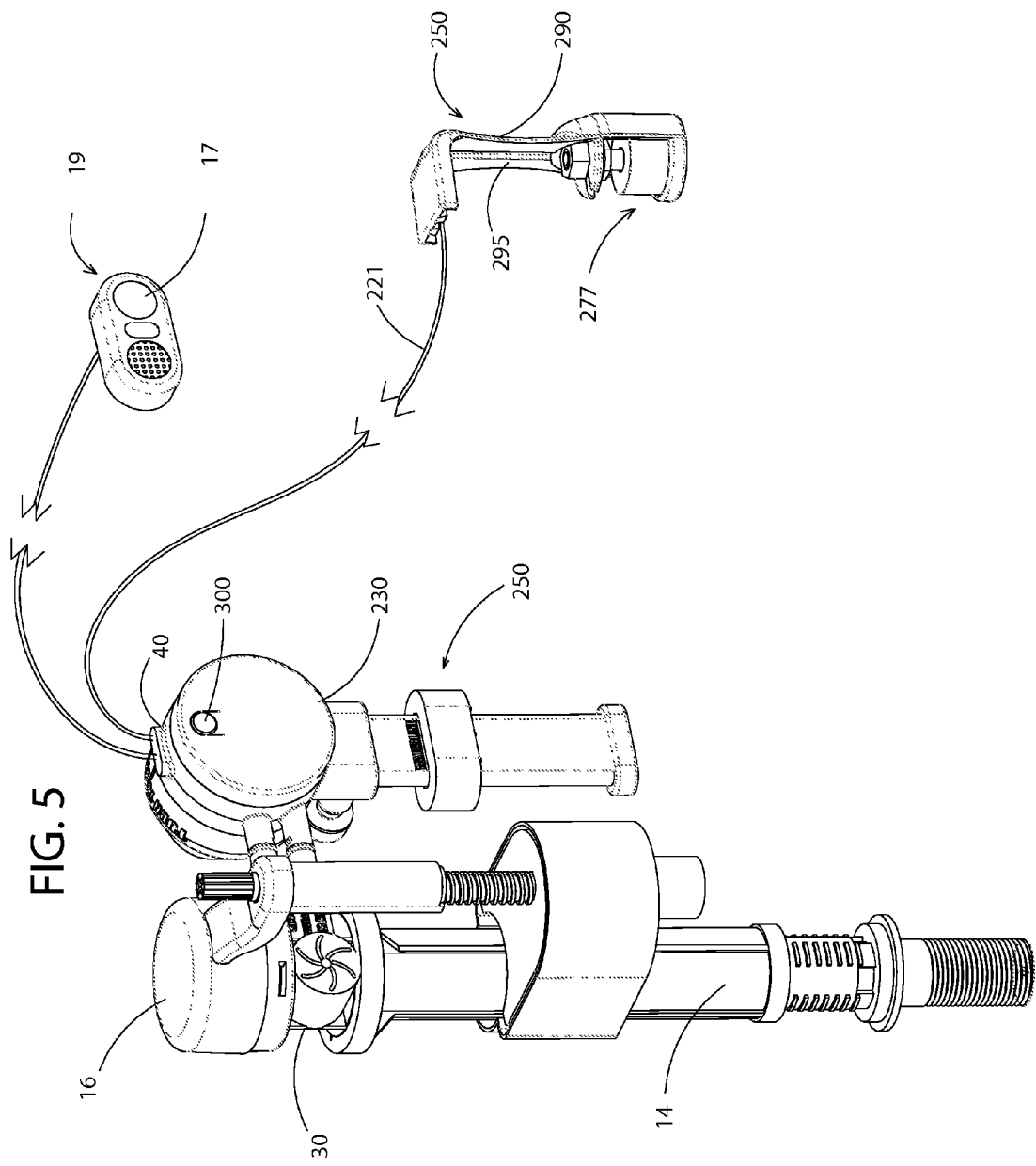

TOILET FILL VALVE WATER LEAK AND OVERFLOW NOTIFICATION DEVICE

CROSS-REFERENCE TO RELATED APPLICATIONS

This application claims the benefit of U.S. Provisional Patent Application 61/445,824, filed on Feb. 23, 2011, and incorporated herein by reference.

STATEMENT REGARDING FEDERALLY SPONSORED RESEARCH AND DEVELOPMENT

Not Applicable.

FIELD OF THE INVENTION

The present disclosure relates general to toilet tank fill controls and more particularly, to water shut-off controls that can react to a malfunction.

DISCUSSION OF RELATED ART

There are no devices that directly address all of the toilet fill and flush malfunctions that are addressed by the present device. Toilet fill and flush mechanisms commonly experience four types of malfunctions, namely: 1) a leaky fill valve wherein the fill valve stays open, or partially open all the time, causing the tank water level to rise to the overflow vent and continue flowing; 2) a leaky flush (flapper) valve wherein the tank water continuously leaks out, slowly, and the fill valves opens intermittently to refill the tank; 3) a flush valve that is stuck in the open position wherein the tank water level never reaches the fill valve float; and 4) a clogged bowl passage or clogged sewer line wherein the tank water flows into the bowl, causing an overflow onto the floor.

Typically, it is desirable to shut off the incoming water supply if any of the four malfunctions occur, and to report selected malfunctions to an alarm unit for maintenance staff. For example, in a hotel it may not be desirable to turn off the incoming water because of a fill valve or flapper valve leak, as this would put the toilet completely out of service. It may be desirable only to report this type of malfunction to maintenance so that it can be repaired in due course. The electronic sensors in the present device are capable of detecting all four of these common malfunctions, to take action with a single shut-off valve if desired, and to report such malfunctions to maintenance staff or other alarm monitoring units.

SUMMARY OF THE INVENTION

The present invention is a device to shut-off a water supply to a water tank of a toilet at a toilet fill valve having a water inlet passage and a water level valve. Such a fill valve is disposed within the water tank, and the water supply is typically a water valve to a water supply below or behind the toilet.

The device comprises a diverter in fluid communication between the water inlet passage and the water level valve of the fill valve. The diverter diverts the water inlet passage and a return line to a first fitting. A shut-off valve has a housing that contains an inlet port that is adapted for fluid connection with the water inlet passage of the first fitting, and an outlet port that is adapted for fluid connection with the return line of the first fitting. The shut-off valve further includes a valve mechanism, a trip mechanism, and a trip circuit electrically connected to the trip mechanism.

The valve mechanism includes a valve housing that rotationally confines a first disk and a second disk, each disk having at least one aperture therethrough and preferably being made from a ceramic material. A compression spring holds the second disk coaxially against the first disk. The at least one aperture in each disk, when mutually aligned in a valve-open position, allows fluid communication between the inlet and outlet ports. Input and output conduits may be included to mechanically and fluidly divert the water from the toilet fill valve through the shut-off valve and back.

The trip mechanism includes a rotational spring that urges rotation of an axial shaft that is fixed coaxially with the second disk. A trip latch is adapted to prevent rotation of the axial shaft and the second disk except when withdrawn from the axial shaft by a solenoid that is electrically connected to the trip circuit. A pair of stops prevents rotation of the second disk beyond preset rotational points. Further, a reset knob is fixed with the rotational spring and the axial shaft, such that once tripped, the reset knob may be manually rotated back to reset the trip mechanism.

The trip circuit further includes at least one trip sensor input and a power source, such as a battery contained within the housing and electrically connected to the trip circuit. Further, the trip circuit may further include an alarm output, such that upon detection of a fault condition an alarm signal may be conveyed to an external alarm unit, an out-of-order indicator that visually indicates that the toilet is out-of-order once a fault condition is detected, or the like.

At least one of the at least one trip sensors is a water tank overflow sensor fixed within or integrally formed with the housing of the shut-off valve. Such a water tank overflow sensor may include a float that, upon reaching an upper limit trips a magnetic reed switch, or the like, and upon reaching a lower limit trips a second magnetic reed switch, or the like, such that the water tank overflow sensor may electrically communicate the state of the water level within the tank when reaching either the upper or lower limit.

In one embodiment, at least one of the at least one trip sensors is a toilet bowl overflow sensor that is preferably selectively fixable with a toilet bowl of the toilet, such as with screws or other mechanical fasteners, and includes an overflow height adjustment for selecting a water line height within the toilet bowl above which the toilet bowl overflow sensor reports a fault condition to the trip circuit.

In use, with the shut-off valve fluidly connected with the diverter of the fill valve, and with the shut-off valve mounted within the water tank of the toilet, and with the trip mechanism in its reset position, when the trip circuit detects a fault condition on any of the at least one trip sensors, the trip circuit connects power to the solenoid to withdraw the trip latch from the axial shaft, the rotational spring thereby rotating the second disk such that the apertures of each disk become misaligned into a valve-closed position, so as to fluidly isolate the inlet and outlet ports. The rest knob may thereafter be rotated to reset tension in the rotational spring and rotate the second disk such that the at least one aperture of each disk become co-aligned.

The electronic sensors in the present device are capable of detecting all four of the common fault conditions of a toilet, to take action with a single shut-off valve, if desired, and to report such fault conditions to maintenance staff or other alarm monitoring units. The present invention is relatively simple to install and use. Other features and advantages of the present invention will become apparent from the following more detailed description, taken in conjunction with the accompanying drawings, which illustrate, by way of example, the principles of the invention.

DESCRIPTION OF THE DRAWINGS

The objects and features of the present invention, which are believed to be novel, are set forth with particularity in the appended claims. The present invention, both as to its organization and manner of operation, together with further objects and advantages, may be best understood by reference to the following description, taken in conjunction with accompanying drawings, in which:

FIG. 4 is an exploded perspective view of the shut-off valve of FIG. 1;

FIG. 4A is a perspective view of a trip mechanism of the shut-off valve, illustrated in a reset position;

FIG. 4B is a perspective view of the trip mechanism of the shut-off valve, illustrated in a tripped position;

FIG. 5 is a rear perspective view of FIG. 1, illustrated with a toilet bowl overflow sensor and an external alarm unit;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
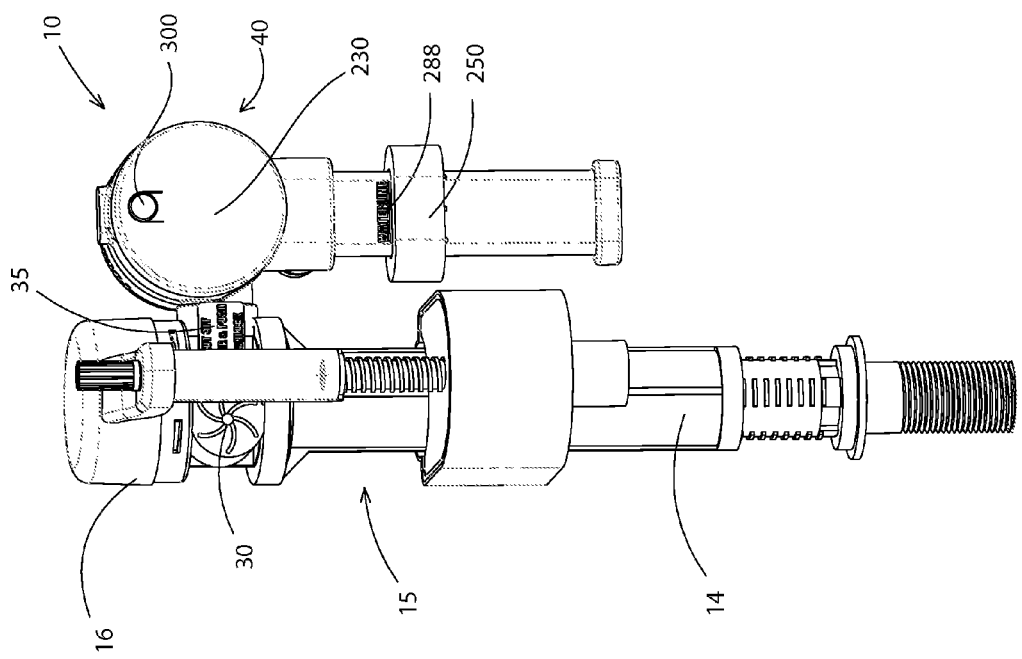
FIG. 1 is a front perspective view of the invention, showing a shut-off valve fixed directly with a diverter of a toilet fill valve.
Figure 2:
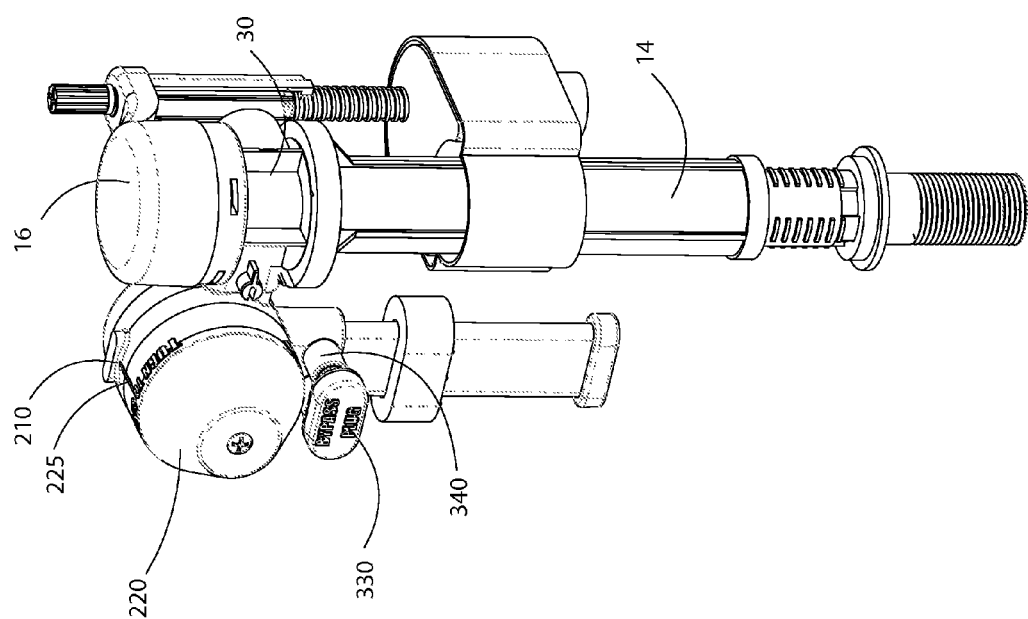
FIG. 2 is a rear perspective view of FIG. 1.
Figure 9:
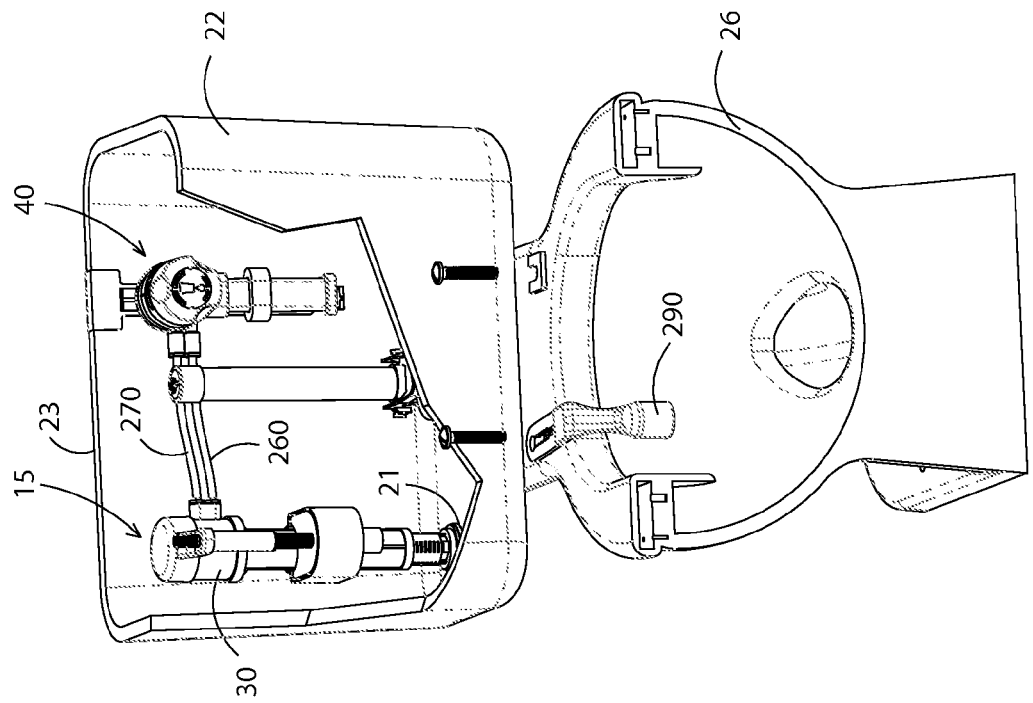
FIG. 9 is a front perspective view of the embodiment of FIG. 8, illustrated as installed in a toilet, the toilet partially broken away.

FIGS. 1, 2 and 9 illustrate a device to shut-off a water supply 18 to a water tank 22 of a toilet 20 at a toilet fill valve 15 having a water inlet passage 14 and a water level valve 16. Such a fill valve 15 is disposed within the water tank 22, and the water supply 18 is typically a water valve to a water supply (not shown) below or behind the toilet 20. The fill valve 15 may be any conventional fill valve 15 that utilizes a float to shut-off the water supply 18 when the water reaches a predetermined maximum water level within the water tank 22.

Figure 3:
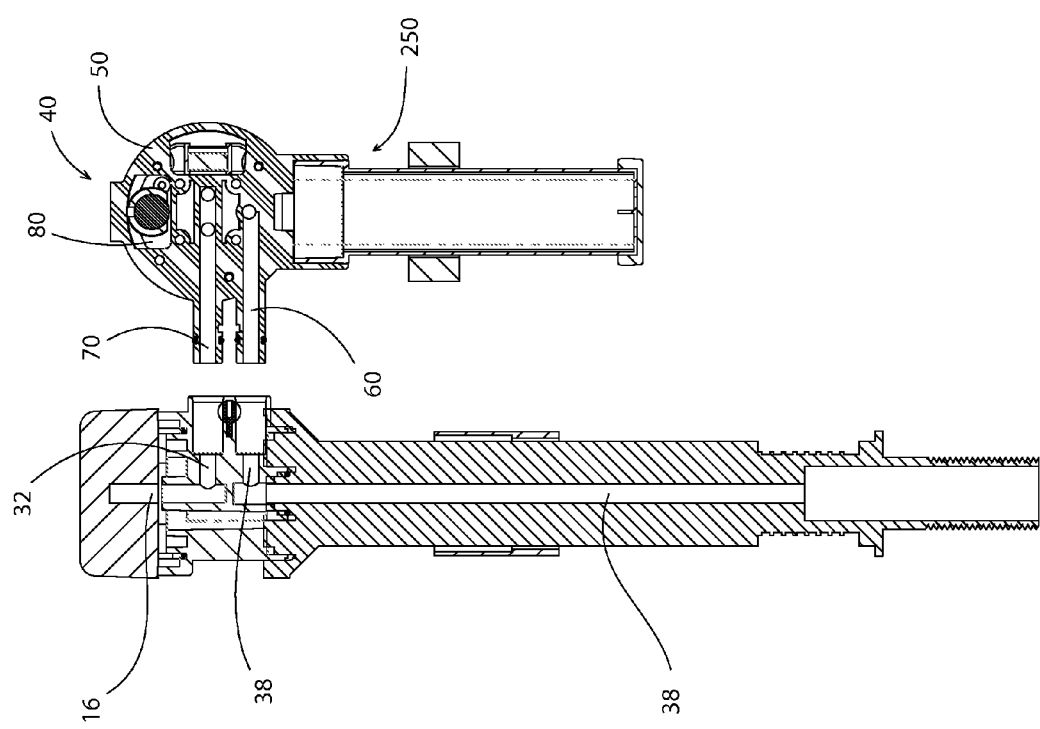
FIG. 3 is a cross-sectional exploded view of FIG. 1.
Figure 6:
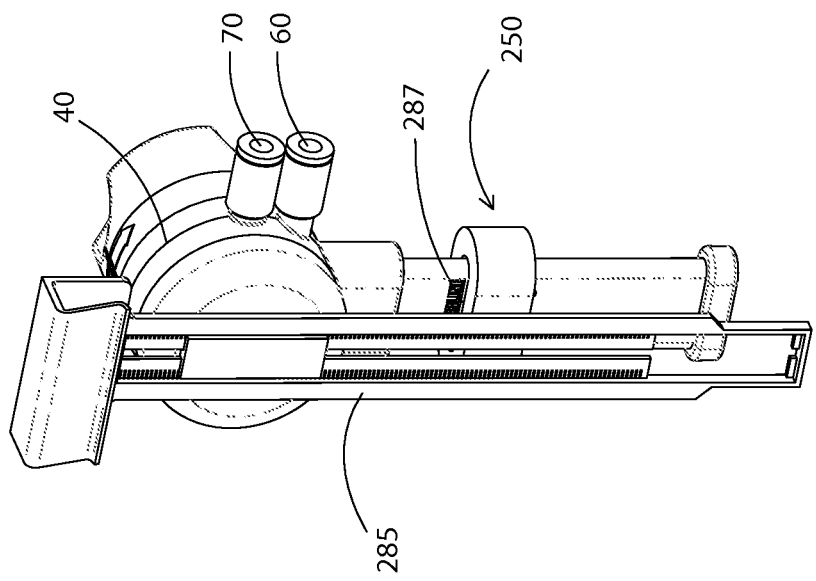
FIG. 6 is a front perspective view of a remote embodiment of the shut-off valve.
Figure 7:
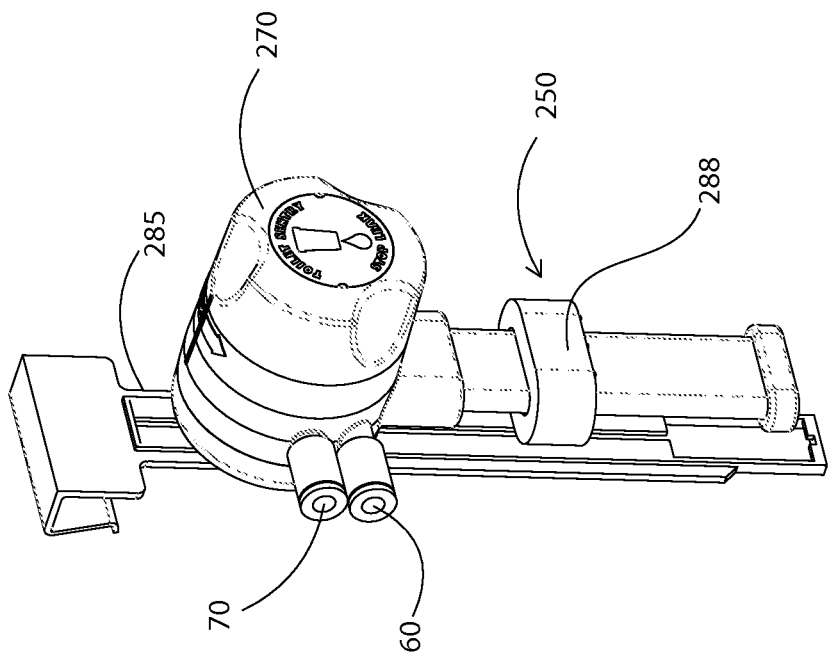
FIG. 7 is a rear perspective view of FIG. 6.

The device 10 comprises a diverter 30 in fluid communication between the water inlet passage 14 and the water level valve 16 of the fill valve 15. The diverter 30 diverts the water inlet passage 14 and a return line 32 to a first fitting 35 (FIG. 3). The fill valve 15 may be of the type that allows the diverter 30 to be installed therein by disassembling the fill valve 15 and reassembling with the diverter 30 installed between the water level valve 16 and the water inlet passage 14. Alternately, a fill valve 15 may be manufactured with the diverter 30 integrally included therewith.

A shut-off valve 40 has a housing 50 that contains an inlet port 60 that is adapted for fluid connection with the water inlet passage 14 of the first fitting 35, and an outlet port 70 that is adapted for fluid connection with the return line 32 of the first fitting 35. The shut-off valve 40 further includes a valve mechanism 80 (FIG. 4), a trip mechanism 90, and a trip circuit 100 electrically connected to the trip mechanism 90. A plastic or rubber bypass fitting 330 may be mechanically fixable with the fitting 35 of the diverter 30 to fluidly connect the water inlet passage 16 directly to the return line 32 of the first fitting 35. The bypass fitting 330 is used when the shut-off valve 40 is removed for servicing or replacement, for example. When not used, the bypass fitting 330 may be stored in a storage receiver 340 formed as part of the housing 50 (FIG. 2).

The valve mechanism 80 includes a valve housing 110 that rotationally confines a first disk 120 and a second disk 130, each disk 120,130 having at least one aperture 140 therethrough and preferably being made from a ceramic material. A compression spring 150 holds the second disk 130 coaxially against the first disk 120. The at least one aperture 140 in each disk 120,130, when mutually aligned, allows fluid communication between the inlet and outlet ports 60,70.

The trip mechanism 90 includes a rotational spring 160 (FIGS. 4A, 4B) that urges rotation of an axial shaft 170 that is fixed coaxially with the second disk 130. A trip latch 180 is adapted to prevent rotation of the axial shaft 170 and the second disk 130 except when withdrawn from the axial shaft 170 by a solenoid 190 that is electrically connected to the trip circuit 100. A pair of stops 200 prevents rotation of the second disk 130 beyond preset rotational points 210. Further, a reset knob 220 is fixed with the rotational spring 160 and the axial shaft 170, such that once tripped (FIG. 4B), the reset knob 220 may be manually rotated back to reset the trip mechanism 90 (FIG. 4A).

In one embodiment, the trip latch 180 includes a raised disk 182 (FIGS. 4A and 4B) at the end of a solenoid actuator 195 of the solenoid 190 that is urged into a notch 184 of the trip latch 180 by a coil spring 188. The trip latch 180 prevents rotation of the axial shaft 170 until withdrawal of the raised disk 182 of the solenoid actuator 195 from the notch 184 of the trip latch 180. The trip latch 180 may be pivotally fixed to the housing 50 such that the rotational spring 160 of the trip mechanism 90 does not cause the trip latch 180 to impart significant lateral force to the raised disk 182 of the solenoid actuator 195, thereby facilitating the withdrawal of the raised disk 182 form the trip latch notch 184 by the solenoid 190.

The trip circuit 100 further includes at least one trip sensor input 230 and a power source 240, such as a battery 245 contained within the housing 50 and electrically connected to the trip circuit 100. Alternately, the power source 240 may be at least one photoelectric cell or other power generator (not shown).

Further, the trip circuit 100 may further include an alarm output 320, such that upon detection of a fault condition an alarm signal may be conveyed to an external alarm unit 17, an out-of-order indicator 19 that visually indicates that the toilet 20 is out-of-order once a fault condition is detected, or the like. The trip circuit 100 may include operating modes that, upon detection of a fault condition, either trip the trip mechanism and convey the alarm signal through the alarm output 320, or trip the trip mechanism 190 without conveying the alarm signal to the alarm output 320, or convey the alarm signal to the alarm output 320 without tripping the trip mechanism 190.

Figure 8:
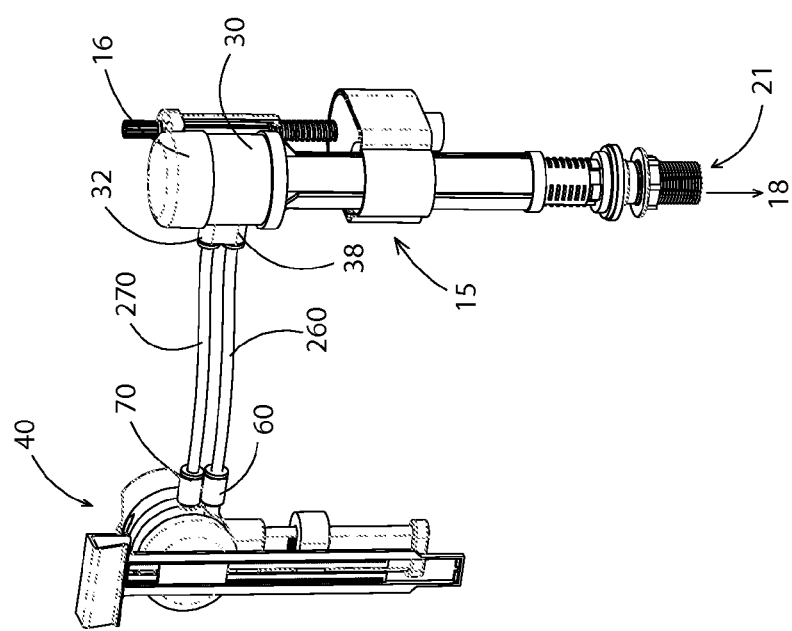
FIG. 8 is a rear perspective view of an input and an output conduit fluidly connecting the shut-off valve of FIG. 6 to the toilet fill valve.
Figure 10:
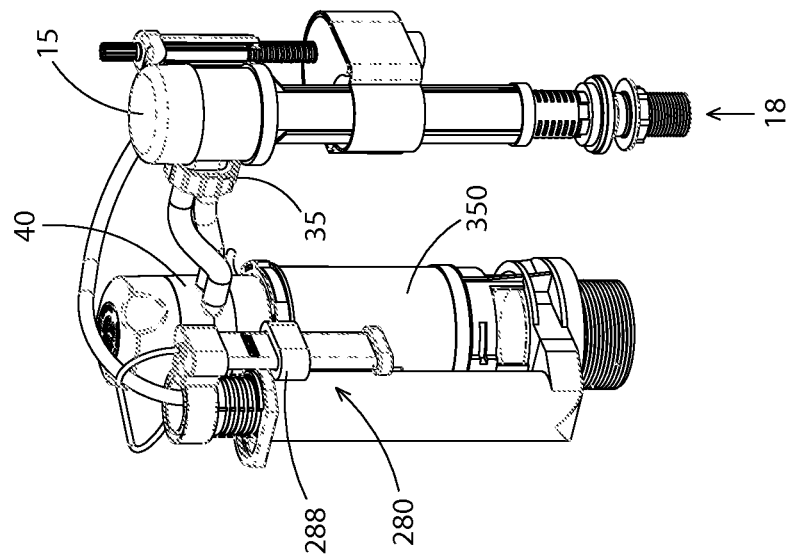
FIG. 10 is a front perspective view of an alternate embodiment of the invention.
Figure 11:
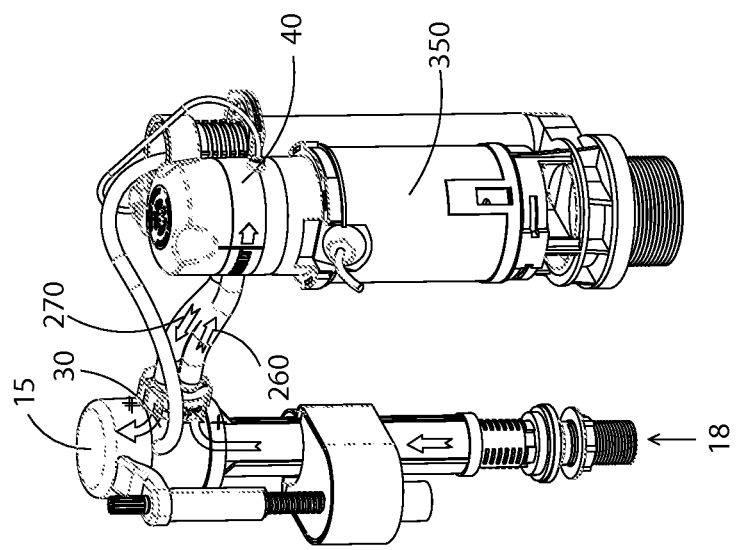
FIG. 11 is a rear perspective view of the embodiment of FIG. 9.

An input conduit 260 (FIGS. 8-11) may be included to mechanically and fluidly connect the water inlet passage 14 of the first fitting 35 with the inlet port 60 of the shut-off valve 40. Likewise, an output conduit 270 may be included to mechanically and fluidly connect the water level valve 16 of the first fitting 35 with the outlet port 70 of the shut-off valve 40. Both the input and output conduits 260,270 may be mutually fixed (FIGS. 8 and 9), or separate (FIGS. 10 and 11). As such, the shut-off valve 40 may be located where space allows remotely within the tank 22 away from the fill valve 15, if necessary.

At least one of the at least one trip sensors 250 is a water tank overflow sensor 280 fixed within or integrally formed with the housing 50 of the shut-off valve 40. Such a water tank overflow sensor 280 may include a float 288 that, upon reaching an upper limit trips a magnetic reed switch (not shown), or the like, and upon reaching a lower limit trips a second magnetic reed switch (not shown), or the like, such that the water tank overflow sensor 280 may electrically communicate the state of the water level within the tank 22 at least between the upper and lower limits.

In one embodiment, the housing 50 is selectively fixable about a top rim 23 of the water tank 22 (FIGS. 6-9). Further, such an embodiment includes an overflow height adjustment 285 for selecting a water line height 287 within the water tank 22 above which the water tank overflow sensor 280 reports a fault condition to the trip circuit 100. Such an overflow height adjustment 285 may include a friction-fit rail and trolley mechanism, and the rails may further include discrete notches for discretely selecting the desired water line height 287 within the tank 22. Clearly such a height adjustment 285 may withstand the buoyancy forced applied thereto within the tank during normal operation without the water tank overflow sensor 280 moving from the user-selected position.

Figure 12:
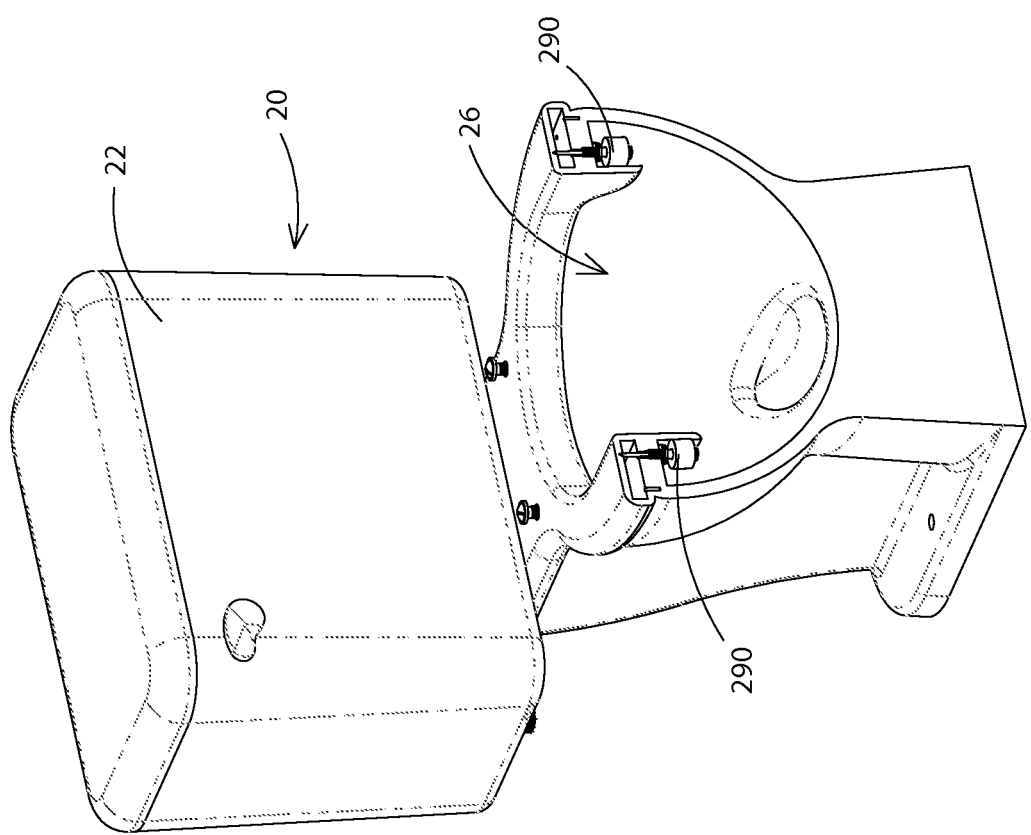
FIG. 12 is an alternate embodiment of the toilet bowl overflow sensor, and an embodiment of a toilet bowl adapted to cooperate therewith.

In one embodiment, at least one of the at least one trip sensors 250 is a toilet bowl overflow sensor 290 (FIGS. 5, 9 and 10). Such a toilet bowl overflow sensor 290 is preferably selectively fixable with a toilet bowl 26 of the toilet 20, such as with screws or other mechanical fasteners, and includes an overflow height adjustment 295 for selecting a water line height 297 within the toilet bowl 26 above which the toilet bowl overflow sensor 290 reports a fault condition to the trip circuit 100. An electrical conductor 291 is connected between the toilet bowl overflow sensor 290 and the at least one trip sensor input 230 of the trip circuit 100. In one embodiment, illustrated in FIG. 12, the invention includes a toilet having toilet bowl wings 27 to shield the toilet bowl overflow sensor 290 from inadvertent contact with cleaning brushes, and the like.

The trip circuit 100 may further include an audible alert transducer 300, such as a speaker or piezoelectric device, that periodically produces an audible alert sound that indicates a fault condition exists and the valve mechanism 80 has been closed, which renders the toilet 20 incapable of being flushed.

In one embodiment the shut-off valve 40 is incorporated into a dual-flush mechanism 350 (FIGS. 10 and 11). As such, the water tank overflow sensor 280 may be a stand-alone unit that is electrically coupled to the at least one trip sensor input 230 of the trip circuit 100.

In use, with the shut-off valve 40 fluidly connected with the diverter 30 of the fill valve 15, and with the shut-off valve 40 mounted within the water tank 22 of the toilet 20, and with the trip mechanism 90 in its reset position (FIG. 4B), when the trip circuit 100 detects a fault condition on any of the at least one trip sensors 250, the trip circuit 100 connects power to the solenoid 190 to withdraw the trip latch 180 from the axial shaft 170, the rotational spring 160 thereby rotating the second disk 130 such that the apertures of each disk 120,130 become misaligned, so as to fluidly isolate the inlet and outlet ports 60,70. The rest knob 220 may thereafter be rotated to reset tension in the rotational spring 160 and rotate the second disk 130 such that the at least one aperture 140 of each disk 120,130 become co-aligned.

While a particular form of the invention has been illustrated and described, it will be apparent that various modifications can be made without departing from the spirit and scope of the invention. For example, the invention could be incorporated into a toilet fill valve as a single unit or product. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A device to shut-off a water supply to a water tank of a toilet at a toilet fill valve having a water inlet passage and a water level valve, said fill valve being disposed within said water tank, said device comprising:
    a diverter in fluid communication between said water inlet passage and said water level valve of said fill valve, said diverter diverting said water inlet passage and a return line to a first fitting;
    a shut-off valve having a housing containing an inlet port adapted for fluid connection with said water inlet passage of said first fitting, an outlet port adapted for fluid connection with said return line of said first fitting, a valve mechanism, a trip mechanism, and a trip circuit electrically connected with said trip mechanism;
    said trip circuit including at least one trip sensor input and a power source, said trip circuit adapted to actuate the valve mechanism;
    at least one trip sensor adapted to sense a fault condition, each trip sensor selectively electrically connected to said trip sensor input;
    whereby with said shut-off valve fluidly connected with said diverter of said fill valve, when said trip circuit detects a fault condition on any of said at least one trip sensors, said trip circuit actuates said valve mechanism to close and
    wherein said valve mechanism including a valve housing rotationally confining a first disk and a second disk, each disk having at least one aperture therethrough, a compression spring holding said second disk coaxially against said first disk, said at least one aperture in each disk when aligned allowing fluid communication between said inlet and outlet ports; and wherein said trip mechanism includes an axial shaft fixed coaxially with said second disk and an actuator to rotate said axial shaft as directed by the trip circuit.

2. The device of claim 1 wherein said actuator of said trip mechanism includes a rotational spring urging rotation of said axial shaft fixed, a trip latch adapted to prevent rotation of said axial shaft and second disk except when withdrawn from said axial shaft by a solenoid electrically connected to said trip circuit, and a reset knob fixed with said rotational spring and axial shaft; whereby with said shut-off valve and double hose connected with said diverter of said fill valve, and with said shut-off valve mounted within said water tank, when said trip circuit detects a fault condition on any of said at least one trip sensors, said trip circuit connects power to said solenoid to withdraw said trip latch from said axial shaft, said rotational spring rotating said second disk such that said apertures of each disk become misaligned, thereby fluidly isolating said inlet and outlet ports, said reset knob being rotatable to reset tension in said rotational spring and rotate said second disk such that said at least one aperture of each disk become co-aligned.

3. The device of claim 2 wherein the trip mechanism further includes a pair of stops to prevent rotation of said second disk beyond two preset rotational points.

4. A device to shut-off a water supply to a water tank of a toilet at a toilet fill valve having a water inlet passage and a water level valve, said fill valve being disposed within said water tank, said device comprising:
    a diverter in fluid communication between said water inlet passage and said water level valve of said fill valve, said diverter diverting said water inlet passage and a return line to a first fitting;
    a shut-off valve having a housing containing an inlet port adapted for fluid connection with said water inlet passage of said first fitting, an outlet port adapted for fluid connection with said return line of said first fitting, a valve mechanism, a trip mechanism, and a trip circuit electrically connected with said trip mechanism;
    said valve mechanism including a valve housing rotationally confining a first disk and a second disk, each disk having at least one aperture therethrough, a compression spring holding said second disk coaxially against said first disk, said at least one aperture in each disk when aligned allowing fluid communication between said inlet and outlet ports;
    said trip mechanism including a rotational spring urging rotation of an axial shaft fixed coaxially with said second disk, a trip latch adapted to prevent rotation of said axial shaft and second disk except when withdrawn from said axial shaft by a solenoid electrically connected to said trip circuit, a stop to prevent rotation of said second disk beyond a preset rotational point, and a reset knob fixed with said rotational spring and axial shaft;
    said trip circuit including at least one trip sensor input and a power source; and
    at least one trip sensor adapted to sense a fault condition, each trip sensor selectively electrically connected to said trip sensor input;
    whereby with said shut-off valve and double hose connected with said diverter of said fill valve, and with said shut-off valve mounted within said water tank, when said trip circuit detects a fault condition on any of said at least one trip sensors, said trip circuit connects power to said solenoid to withdraw said trip latch from said axial shaft, said rotational spring rotating said second disk such that said apertures of each disk become misaligned, thereby fluidly isolating said inlet and outlet ports, said reset knob being rotatable to reset tension in said rotational spring and rotate said second disk such that said at least one aperture of each disk become co-aligned.

5. The device of claim 4 further including an input conduit for mechanically and fluidly connecting said water inlet passage of said first fitting with said inlet port of said shut-off valve, and an output conduit for mechanically and fluidly connecting said return line of said first fitting with said outlet port of said shut-off valve.

6. The device of claim 4 wherein one of said at least one trip sensor is a water tank overflow sensor fixed with said housing.

7. The device of claim 6 wherein said housing is selectively fixable about a top rim of said water tank, and wherein said water tank overflow sensor includes an overflow height adjustment for selecting a water line height within said water tank above which said water tank overflow sensor reports a fault condition to said trip circuit.

8. The device of claim 4 wherein one of said at least one trip sensors is a toilet bowl overflow sensor.

9. The device of claim 8 said toilet bowl overflow sensor is selectively fixable with a toilet bowl and includes an overflow height adjustment for selecting a water line height within said toilet bowl above which said toilet bowl overflow sensor reports a fault condition to said trip circuit.

10. The device of claim 4 wherein said trip circuit further includes an audible alert transducer for periodically producing an audible alert of said detection of a fault condition and a closed valve mechanism.

11. The device of claim 2 wherein said power source is a battery contained within said housing and electrically connected to said trip circuit.

12. The device of claim 2 wherein said trip latch includes a raised disk at said end of a solenoid actuator that is urged into a notch of said trip latch by a coil spring, said trip latch preventing rotation of said axial shaft until withdrawal of said raised disk of said solenoid actuator from said notch of said trip latch.

13. The device of claim 2 wherein said trip latch is pivotally fixed to said housing such that said rotational spring of said trip mechanism does not cause said trip latch to impart significant lateral force to said raised disk of said solenoid actuator, thereby facilitating said withdrawal of said raised disk from said trip latch by said solenoid.

14. The device of claim 4 wherein said trip circuit further includes an alarm output, whereby upon detection of a fault condition an alarm signal may be conveyed to an external device.

15. The device of claim 14 wherein said trip circuit may include operating modes wherein upon detection of a fault condition, said trip circuit may either trip said trip mechanism and convey said alarm signal through said alarm output, or trip said trip mechanism without conveying said alarm signal, or convey said alarm signal without tripping said trip mechanism.

16. The device of claim 15 wherein said alarm signal may be conveyed to an out-of-order indicator for display near said toilet, whereby upon detection of said alarm signal, said out-of-order indicator is activated.

17. The device of claim 1 further including a bypass fitting mechanically fixable with said fitting of said diverter, said bypass fitting fluidly connecting said water inlet passage to said return line of said first fitting.

18. The device of claim 17 wherein said shut-off valve housing is selectively detachable from said fill valve and further includes a storage receiver adapted for receiving and retaining said bypass fitting therein when said bypass fitting is not in use and when said shut-off valve housing is attached to said fill valve.

19. The device of claim 6 wherein said water tank overflow sensor includes an overflow height adjustment for selecting a maximum tank water line height above which said water tank overflow sensor reports a fault condition to said trip circuit.

\* \* \* \* \*